(12) United States Patent  (10) Patent No.: US 7,555,359 B2
Badarinarayan et al.  (45) Date of Patent: Jun. 30, 2009

(54) APPARATUS AND METHOD FOR CORRECTING DEFECTS BY FRICTION STIR PROCESSING

(75) Inventors: Harsha Badarinarayan, Novi, MI (US); Frank Hunt, West Bloomfield, MI (US); Kazutaka Okamoto, Novi, MI (US)

(73) Assignee: Hitachi, Ltd, Tokyo (JP)

( * ) Notice: Subject to any disclaimer, the term of this patent is extended or adjusted under 35 U.S.C. 154(b) by 0 days.

(21) Appl. No.: 11/539,468

(22) Filed: Oct. 6, 2006

(65) Prior Publication Data

US 2008/0154423 A1 Jun. 26, 2008

(51) Int. Cl.
*G06F 19/00* (2006.01)
(52) U.S. Cl. ........................... 700/175; 228/201
(58) Field of Classification Search ............ 700/110, 700/111, 115, 147, 150, 169; 73/302, 627, 73/643
See application file for complete search history.

(56) References Cited

U.S. PATENT DOCUMENTS

| 5,460,317 | A | 10/1995 | Thomas et al. |
| 5,879,277 | A | 3/1999 | Dettman et al. |
| 5,975,406 | A | 11/1999 | Mahoney et al. |
| 6,230,957 | B1 * | 5/2001 | Arbegast et al. ......... 228/112.1 |
| 6,422,449 | B1 | 7/2002 | Ezumi et al. |
| 6,648,206 | B2 * | 11/2003 | Nelson et al. ............ 228/112.1 |
| 6,866,180 | B2 | 3/2005 | Mahoney et al. |
| 7,000,303 | B2 | 2/2006 | Talwar et al. |
| 7,225,968 | B2 * | 6/2007 | Packer et al. ............ 228/112.1 |
| 2004/0078306 | A1 * | 4/2004 | Whiteley et al. ............. 705/28 |
| 2005/0061853 | A1 | 3/2005 | Packer et al. |
| 2006/0021208 | A1 | 2/2006 | Pfau et al. |
| 2006/0265876 | A1 * | 11/2006 | Kimura et al. ......... 29/894.351 |
| 2007/0040006 | A1 * | 2/2007 | Charles R. et al. ....... 228/112.1 |
| 2007/0234809 | A1 * | 10/2007 | Klein et al. .................. 73/602 |

OTHER PUBLICATIONS

Mishra, et al., Friction Stir Processing: A New Grain Refinement Technique to Achieve High Strain Superplasticity in Commercial Alloys, Superplasticity in Advanced Materials, ICSAM-2000 Materials Science Forum, 357-3 (2001) 507.

* cited by examiner

*Primary Examiner*—Kidest Bahta
(74) *Attorney, Agent, or Firm*—Gifford, Krass, Sprinkle, Anderson & Citkowski, P.C.

(57) ABSTRACT

A method for correcting surface and near surface defects in metal components in which the component is first inspected to identify both the site and size of a component defect. Thereafter, it is determined if the defect is correctable by friction stir processing and, if so, the defect is corrected by performing friction stir processing on the component at the site of the defect. Optionally, one of several different sized friction stir processing tools is selected as a function of the size of the defect.

25 Claims, 4 Drawing Sheets

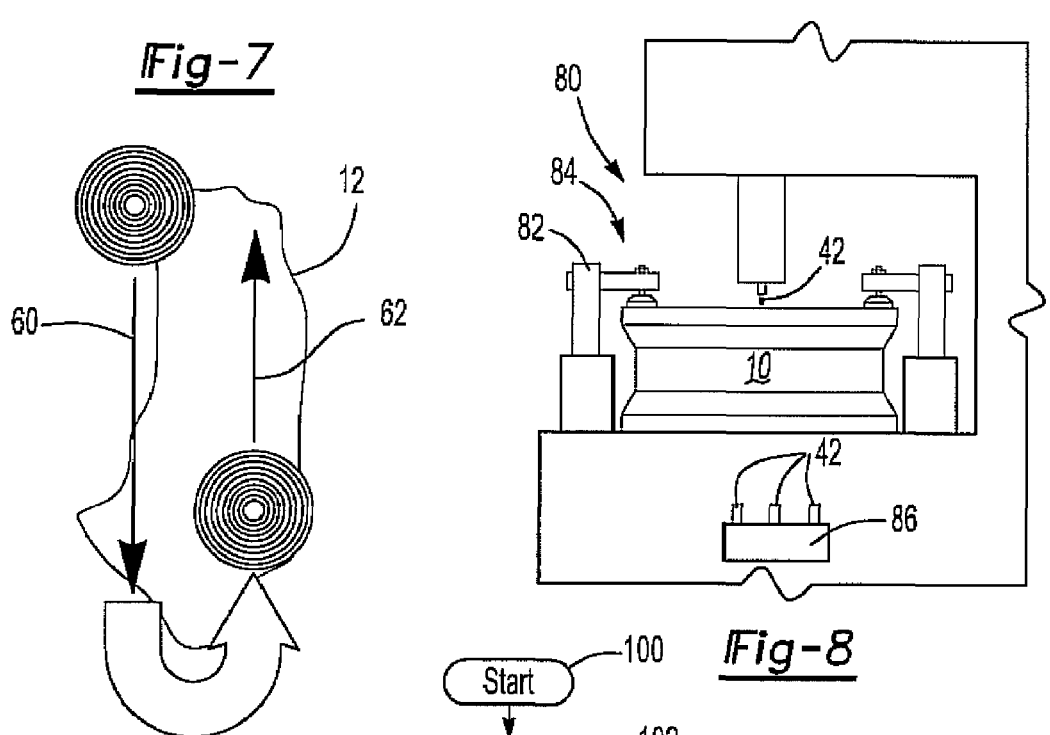
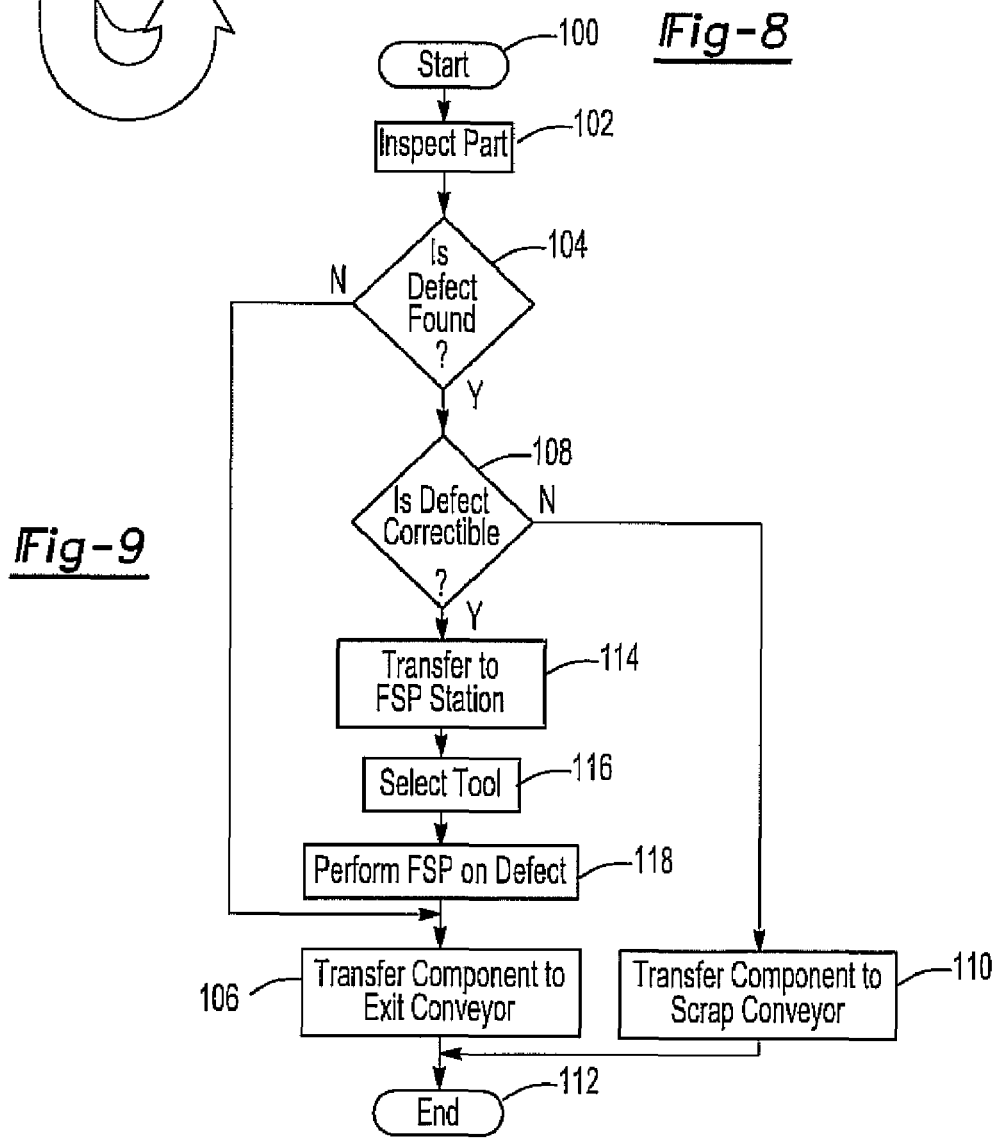

APPARATUS AND METHOD FOR CORRECTING DEFECTS BY FRICTION STIR PROCESSING

BACKGROUND OF THE INVENTION

1. Field of the Invention

The present invention relates to a method for correcting surface and near surface defects in metal components by friction stir processing.

2. Description of the Material Art

Metal and resin components, and particularly components formed by casting, oftentimes contain surface and near surface defects. In some cases, the defect is sufficiently small or in a non-visible area or in a non-key structural area, such that the component is still acceptable despite the defect. However, in other situations, the defect is either sufficiently large so that it adversely affects the mechanical properties of the component or the defect is formed on a visible cosmetic surface, such that the defect is not acceptable.

Unfortunately, in many situations a great deal of manufacturing or machining has already been performed on the component before the defect is detected. Such manufacturing and machining increases the overall per component manufacturing cost.

For example, in the manufacturing of an automotive wheel hub, the hub is typically formed from a casting which is thereafter machined as a part of the manufacturing process. It is, therefore, disadvantageously expensive to thereafter scrap the wheel hub in the event that an unacceptably large or cosmetically unacceptable defect is found on the component.

SUMMARY OF THE INVENTION

The present invention provides a method and apparatus for correcting surface and near surface defects in metal and resin components which overcomes the above-mentioned disadvantages.

In brief, in the method of the present invention, the component is first inspected to identify both the site and the size of a component defect. In many cases, it is known in advance that component defects are commonly found at only predetermined locations on the components so that, in these situations, it is only necessary to inspect those areas of the component that are likely to contain a defect.

Any conventional means may be utilized to perform the component inspection. However, preferably x-ray inspection is performed on the component, or a portion of the component, in order to detect any component defect, such as a void, as well as the size of that defect.

After it has been determined that the component contains a defect and the size of that defect, it is then determined if the defect is correctable by friction stir processing. In some cases, the defect may be too deeply embedded within the component to be corrected by friction stir processing or the size or the number of defects on the component may be simply too large to economically correct by friction stir processing. In those situations, the component is rejected and scrapped.

Conversely, if the defect is sufficiently small or otherwise correctable economically by friction stir processing, friction stir processing is performed on the component at the site of the defect, thus eliminating the defect. Consequently, by correction of the component defect through friction stir processing, it is no longer necessary to scrap components that have unacceptable surface or near surface defects.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which:

FIG. 7 is a diagrammatic view illustrating friction stir processing using multiple passes;

FIG. 8 is an elevational view of an exemplary friction stir processing station; and FIG. 9 is a flowchart illustrating an embodiment of the present invention.

DETAILED DESCRIPTION OF THE PREFERRED EMBODIMENTS

Figure 1:
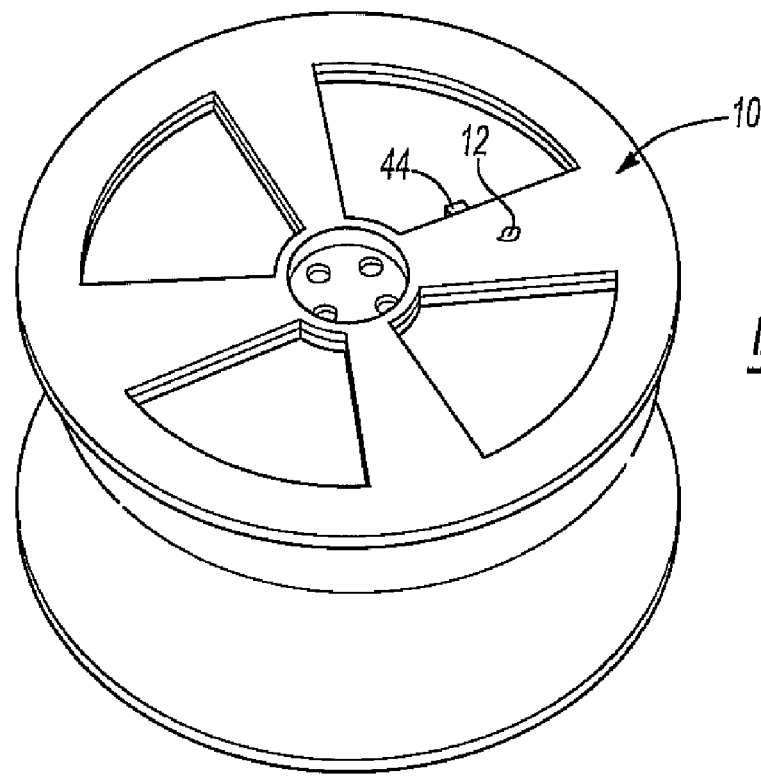
FIG. 1 is an elevational view illustrating an exemplary component with a defect.

With reference first to FIG. 1, a manufactured component 10, such as a wheel hub, is illustrated as an exemplary component for use in conjunction with the method and apparatus of the present invention. The wheel hub 10, which is typically manufactured by casting, includes a surface or near surface defect 12 on or near one or more of its outer surfaces. The defect 12, furthermore, is either sufficiently large that it adversely affects the structural properties of the hub 10 or on a cosmetic surface or in a key structural area so that the defect 12 renders the wheel hub 10 unacceptable to the customer. It will be understood, of course, that the wheel hub 10 is by way of example only and that the present invention may be used with any metal or resin or potentially other material component.

Figure 2:
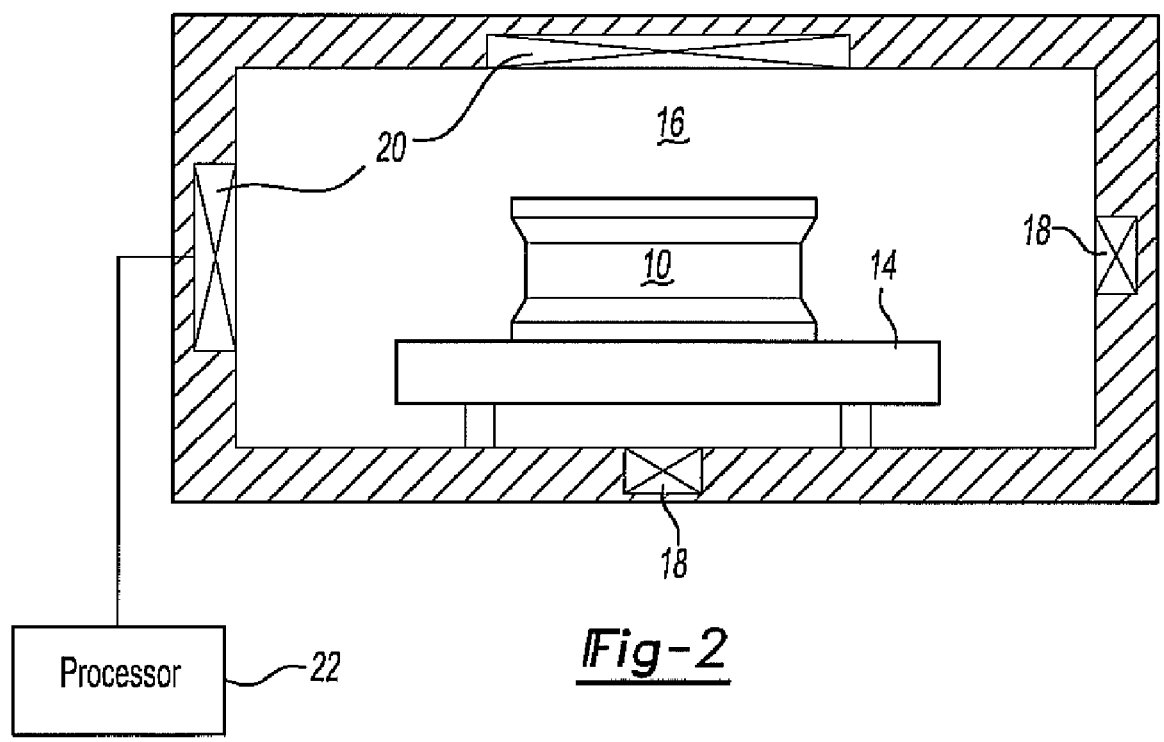
FIG. 2 is a block diagrammatic view of an inspection station.

With reference now to FIG. 2, the component 10 is first positioned on a conveyor 14 and conveyed to an inspection station 16. At the inspection station, the component 10 is examined to determine not only the existence of one or more defects 12 on the component 10, but also the size and site or location of those defects. Although any conventional inspection method may be utilized, such as x-ray inspection, acoustical inspection and eddy current inspection, typically x-ray inspection is utilized to examine the component 10. One or more x-ray emitters 18 are positioned at the inspection station 16 which emit x-ray radiation through the component 10 while x-ray detectors 20 detect the x-ray emissions after passage through the component 10. In doing so, any voids contained within the component 10 will result in increased intensity of the radiation detected by the detectors 20. Consequently, voids in the component 10 may be identified by the receipt of radiation by the detectors above a preset threshold.

In certain types of components, and especially in cast metal components, it is known that the likelihood of defects in the component only typically occur in certain limited areas of the component due to the casting operation. Consequently, it may be necessary only to inspect those limited areas of the component at the inspection station, rather than the entire component 10. Such limited inspection of the component 10 provides for quicker and more efficient operation of the present invention.

The output from the detectors 20 is coupled as an input signal to a processor 22. The processor 22 may be of any conventional construction and is typically microprocessor based. In particular, the processor 22 in determination of the output from the radiation detectors 20 identifies both the size and site of any defects 12 on the component 10.

Figure 3:
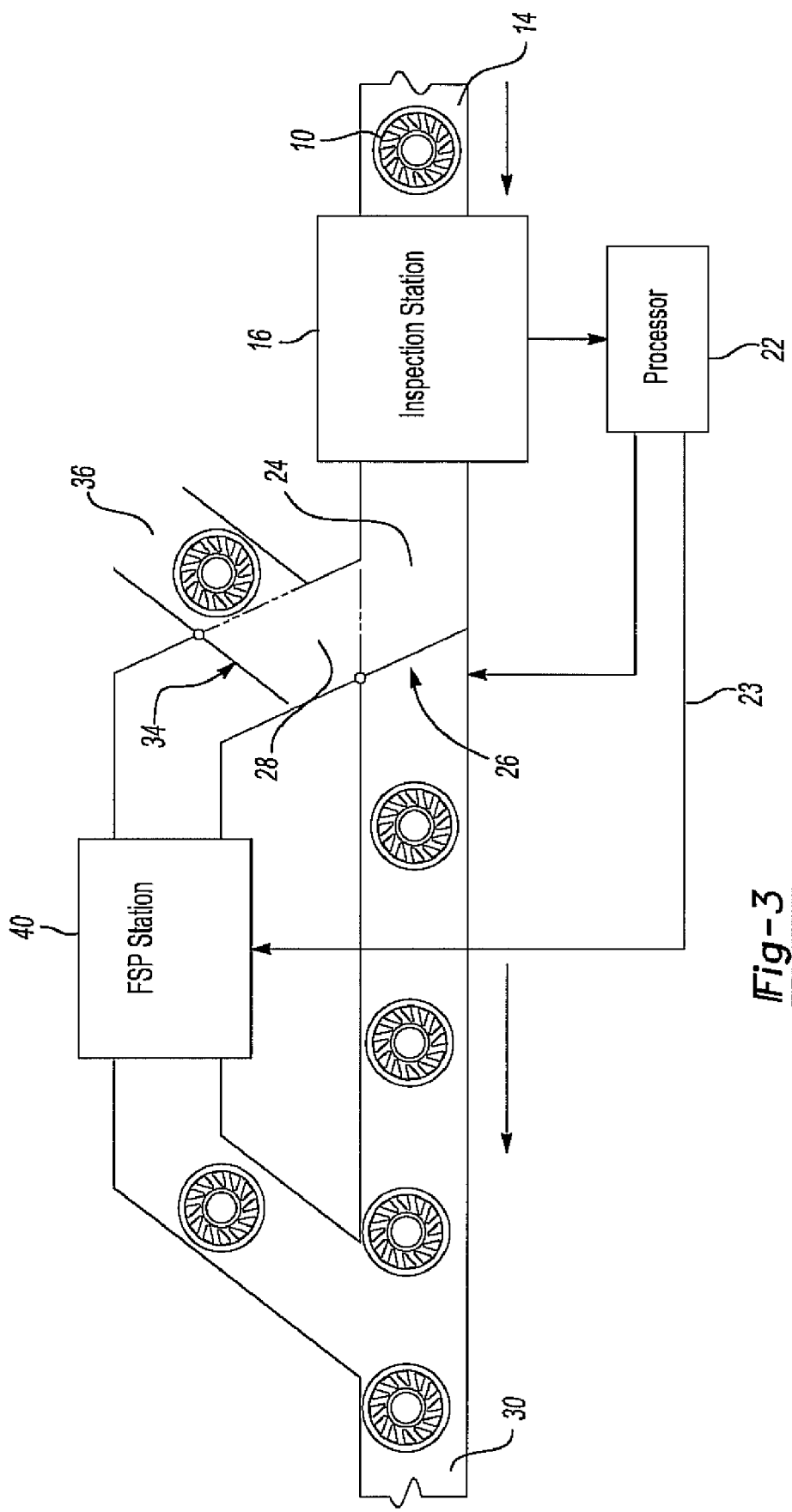
FIG. 3 is a diagrammatic view illustrating a preferred embodiment of the present invention.

With reference now to FIG. 3, an exemplary inspection line for inspecting a series of similar components is illustrated. The components 10 are conveyed on the conveyor 14 sequentially to the inspection station 16. Following the inspection at the inspection station 16, the conveyor 14 conveys the components 10 to an outlet end of the inspection station 16 and towards a conveyor gate 26.

The conveyor gate 26 is moveable between a first position, illustrated in solid line in which the conveyor gate 26 diverts components from the inspection station 16 to a side conveyor 28, and a second position, illustrated in phantom line, in which the components 10 are conveyed on the conveyor 14 to an outlet end 30 of the conveyor 14.

In operation, each component 10 is inspected at the inspection station 16. If no unacceptable defects are found on the component 10, the processor 22 actuates the gate 26 to move the gate to its second position. In doing so, the defect-free component 10 is conveyed directly on the conveyor 14 to the outlet end 30.

Conversely, if the component contains unacceptable defects, the processor 22 actuates the gate 26 to its first position and diverts the component 10 containing the defect to the side conveyor 28 and toward a second conveyor gate 34. In some situations, the areal size of the defect on the component 10 is so large or the defect so deep, e.g. greater than five or six millimeters for a metal component, that it cannot be corrected by friction stir processing. Similarly, in some situations, the component contains so many defects that the component cannot economically be corrected through friction stir processing. In either event the processor 22 actuates the second conveyor gate 34 to the position shown in solid line and diverts the component 14 to a reject conveyor line 36.

If the defect contained on the component 10 is a surface or near surface defect and is correctable through friction stir processing, the processor 22 actuates the gate 34 to a second position illustrated in phantom line so that the component 10 containing the defect is conveyed to a friction stir processing station 40. The processor 22 also transmits information, e.g. the size, depth and position of the defect 12, to the friction stir processing station 40 to enable the station 40 to correct the defect 12.

Figure 4:
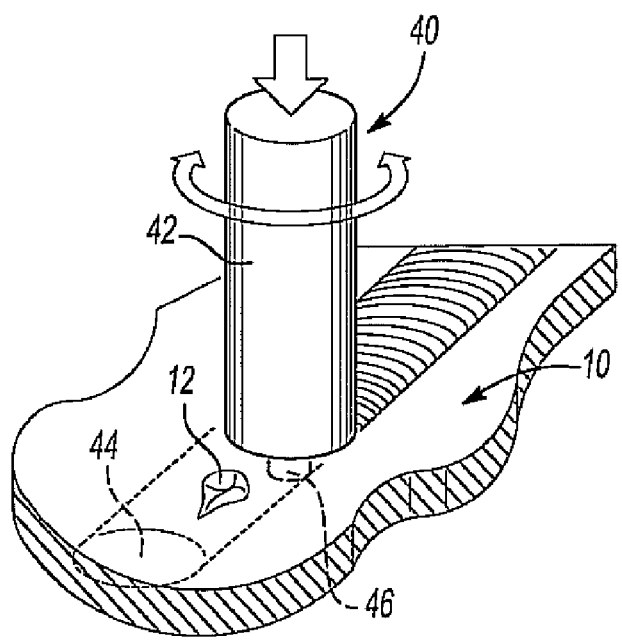
FIG. 4 is a diagrammatic view illustrating a friction stir processing operation.

With reference now particularly to FIG. 4, an exemplary friction stir processing is illustrated in which a friction stir processing tool 42 is rotatably driven through the defect 12 thus eliminating the defect 12. Since the friction stir processing tool 42 leaves a keyhole in the component 10 upon exit the component 10 optionally includes a tab 44 (FIG. 1) to which the friction stir processing tool is moved prior to removing the tool 42 from the component 10. Optionally, the keyhole from the friction stir processing may be filled after the friction stir processing. Such a tab 44 may be positioned in a non-cosmetic, i.e., unseen position, or may be subsequently removed by machining following the friction stir processing operation. In other situations, the friction stir processing tool is moved to a non-critical and/or non-cosmetic area on the component 10 prior to its removal from the component 10.

Figure 5:
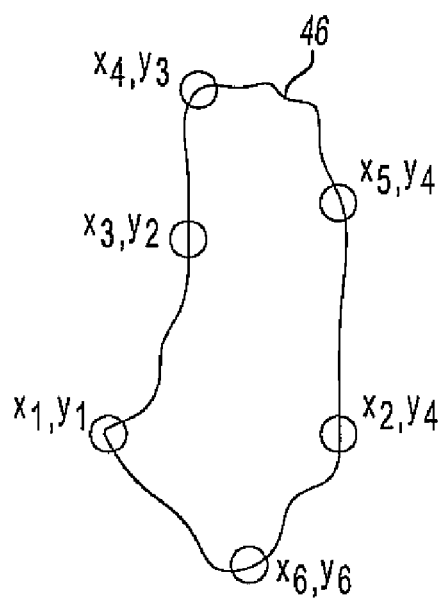
FIG. 5 is a view of an exemplary defect in a component.

With reference now to FIG. 5, in some situations, the defect 12 includes an irregular shape as illustrated by the loop 46 in FIG. 5. In such a situation, the movement of the friction stir processing tool 42 is controlled through appropriate curve fitting routines in order to follow the curve of the defect 46 through one or more passes of the tool 42 along the defect to ensure that friction stir processing is performed around the entire defect 46. For example, as shown in FIG. 5, the friction stir processing operation may be at point x1, y1 and then proceed in a clockwise fashion to point x3, y2, point x4, y3, point x5, y4, point x2, y4, point x6, y6 and finally back to point x1, y1.

With reference now to FIG. 7, in some cases the defect 12 is relatively large in areal size but sufficiently shallow that it is correctable by friction stir processing. In that event multiple passes 60 and 62 may be performed to correct the defect 12.

It will be understood, of course, that during the friction stir processing operation, it is only necessary if the friction stir processing tool 42 and component 10 move relative to each other. For example, typically the component 10 is maintained in a stationary position by an appropriate clamping jig while the tool is moved relative to the component 10. However, alternatively, the friction stir processing tool 42 may be held stationary about its axis while the component 10 is moved relative to the tool 42 to perform the friction stir processing operation, or even a combination of movement of the component 10 and tool 42.

Figure 6A:
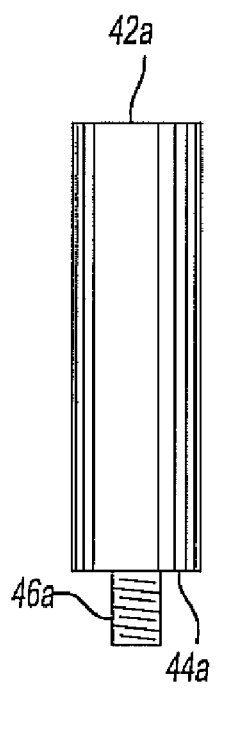
FIGS. 6A, 6B and 6C are plan views of exemplary friction stir processing tools.
Figure 6B:
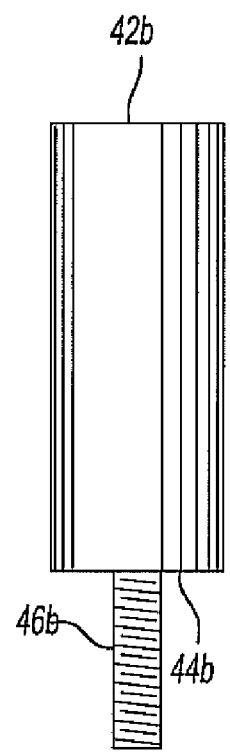
Figure 6C:
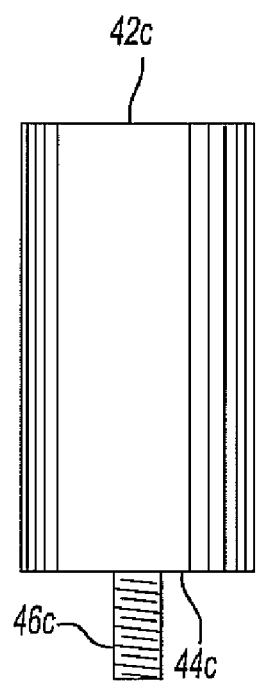

With reference now to FIG. 6, three different friction stir processing tools 42a, 42b, and 42c are illustrated in which the friction stir processing tools 42a-42c differ from each other in the size of their shoulder 44a-44c as well as their pin 46a-46c. Depending upon the size of the defect in the component 10, the appropriate friction stir processing tool 42a-42c is selected prior to performing the friction stir processing operation at the station 40. For example, after the processor 22 (FIG. 3) determines the size of the defect in the component 10, the processor 22 controls the operation of the friction stir processing station 40 to select the appropriate tool 42a-42c such that the diameter of the tool shoulder 44 overlaps the defect by approximately 10% or more. However, it is desirable to select the smallest shoulder diameter tool 42a-42c which is sufficient to correct the defect without performing friction stir processing on the component more than is necessary.

It will be understood, of course, that the performance of the friction stir processing on the component 10 at the station 40 preferably occurs automatically under machine or robotic control. Consequently, the selection of the proper friction stir processing tool 42, as well as the area and direction of the processing path performed at the station 40 is preferably performed automatically under machine control. One such tool selection apparatus is disclosed in U.S. patent application Ser. No. 11/425,798, filed Jun. 22, 2006, entitled "Tool Assembly Used with Friction Stir Welding" and which is incorporated herein by reference.

With reference now to FIG. 8, an exemplary friction stir processing station is shown having a friction stir processing machine 80 such as a friction stir spot or gantry welding machine. The component 10 is mounted in a jig 82 and clamped against movement in the jig 82 by clamps 84. Different friction stir processing tools 42 are selected from a tool changing station 86 as required in dependence on the size and depth of the defect 12.

With reference now to FIG. 9, a simplified flowchart illustrating the operation of the method of the present invention is shown. At step 100, the program is initiated and proceeds to step 102. At step 102, the component is inspected at the inspection station 16 under control of the processor 22. Step 102 then proceeds to step 104.

At step 104, the processor determines if any defects are found on the component 10. If not, step 104 branches to step 106 and activates the gate 26 to its second position, illustrated in phantom line in FIG. 3, so that the component is conveyed directly to the exit conveyor 30. Alternatively, the component 10 may be conveyed back to the inspection station 16 for reinspection.

Conversely, if a defect is found on the component, step 104 instead branches to step 108 where the processor 22 determines if the defect is fixable. In doing so, the processor will examine not only the areal size, but also the depth of the defect as well as the number of defects. If the defect is not correctable, or is economically too expensive, step 108 branches to step 110 where the processor activates the gates 26 and 34 to their first positions, illustrated in solid line, so that the defective component is transferred to the reject conveyor line 36. Step 110 then branches to step 112 and exits from the routine.

If, however, the defect on the component is correctable, step 108 instead branches to step 114 where the processor 22 actuates both conveyors 26 and 34 so that the component 10 is transported by the conveyor 28 to the friction stir processing station. The processor 22 also transmits instructions and information to the friction stir processing station 40 on line 23 representative of the position or site of the defect and the size and depth of the defect.

Step 114 then proceeds to step 116. At step 116 the friction stir processing station 40, under control of the processor 22, selects the appropriate tool to correct the defect identified at the inspection station 16. Step 116 then proceeds to step 118 where the processor instructs the friction stir processing station 40 to perform friction stir processing on the component to correct the defect. Step 118 then proceeds to step 106 where the now defect-corrected component is transferred to the exit conveyor 30 and then ultimately to step 112 where the routine is exited.

With reference again to FIG. 3, although FIG. 3 illustrates the method of the present invention performed on identical components 10, i.e. wheel hubs, it is also possible for different types of components to be conveyed on the conveyor 14 to the inspection station 16 and processed, as required, at the friction stir processing station 40. In this event, the processor 22 is programmed to identify which type of component is currently under inspection at the station 16. Any of numerous means may be utilized to perform this identification of the type of component.

For example, the processor 22 may identify the component 10 by using optical identification, RFID tag identification, barcode or the like. If the different components have different weights, a simple weighing station may be performed just prior to the inspection station 16 in order to identify the components 10 by weight. Still other means may be utilized to perform the identification of the type of component.

In the event that different types of components are conveyed to the inspection station 16, it will be necessary for different clamping jigs to be utilized at the friction stir processing station 40 wherein each jig accommodates a different type of component 10. Such clamping jigs are conventional in construction and may align with the appropriate component in any conventional way, such as a turntable conveyor which aligns the appropriate jig with the incoming components or other means. In any event, the component must be finely clamped prior to the friction stir processing operation.

From the foregoing, it can be seen that the present invention provides a simple and yet effective means for correcting surface and near surface defects on metal components and especially cast metal components. Having described my invention, however, many modifications thereto will become apparent to those skilled in the art to which it pertains without deviation from the spirit of the invention as defined by the scope of the appended claims.

We claim:

1. A method for correcting surface and near surface defects in components comprising the steps of:
   inspecting the component to identify a site of a component defect,
   determining if the defect is correctable by friction stir processing,
   if so, transmitting information concerning the defect to a friction stir processing station, and
   performing friction stir processing on the component at the site of the defect to thereby correct the defect.

2. The invention as defined in claim 1 wherein said determining step further comprises the step of determining the size of the defect and performing friction stir processing at the site of the defect only when the size and/or depth of the defect is less than a predetermined amount.

3. The invention as defined in claim 1 wherein said determining step further comprises the step of determining the size of the defect and further comprising the step of selecting a friction stir processing tool dimensioned as a function of the defect size and/or depth necessary to correct the defect.

4. The invention as defined in claim 1 wherein said performing step further comprises the step of calculating a path necessary to correct the defect and thereafter moving a friction stir processing tool along said path.

5. The invention as defined in claim 1 wherein said inspecting step comprises the step of x-ray inspection of the component.

6. The invention as defined in claim 1 wherein said inspecting step comprises the step of inspecting only a predefined portion of the component.

7. A method for correcting surface and near surface defects in at least two types of components, each type of component having a different shape, the method comprising the steps of:
   identifying the type of the component,
   inspecting the component to identify a site of a component defect,
   determining if the defect is correctable by friction stir processing,
   if so, transmitting information concerning the defect to a friction stir processing station,
   placing the component in a clamping jig specific to the component type, and
   performing friction stir processing on the component at the she of the defect to thereby correct the defect.

8. The invention as defined in claim 7 wherein said determining step further comprises the step of determining the size of the defect and performing friction stir processing at the she of the defect only when the size and/or depth of the defect is less than a predetermined amount.

9. The invention as defined in claim 7 wherein said determining step further comprises the step of determining the size and/or depth of the defect and further comprising the step of selecting a friction stir processing tool dimensioned as a function of the defect size necessary to correct the defect.

10. The invention as defined in claim 7 wherein said performing step further comprises the step of calculating a path necessary to correct the defect and thereafter moving a friction stir processing tool along said path.

11. The invention as defined in claim 7 wherein said inspecting step comprises the step of x-ray inspection of the component.

12. The invention as defined in claim 7 wherein said inspecting step comprises the step of inspecting only a predefined portion of the component.

13. A method for correcting surface and near surface defects in components comprising the steps of:
   inspecting the component to identify a site and size and/or depth of a component defect,
   determining if the defect is correctable by friction stir processing,
   if so, transmitting information to a friction stir processing station to select a friction stir processing tool as a function of the size of the defect and thereafter perform friction stir processing on the component at the site of the defect with the selected tool and performing friction stir processing on the component at the site of the defect to thereby correct the defect.

14. The invention as defined in claim 13 wherein said determining step further comprises the step of determining the size of the defect and performing friction stir processing at the site of the defect only when the size of the defect is less than a predetermined amount.

15. The invention as defined in claim 13 wherein said performing step further comprises the step of calculating a path necessary to correct the defect and thereafter moving the selected friction stir processing tool along said path.

16. The invention as defined in claim 13 wherein said inspecting step comprises the step of x-ray inspection of the component.

17. The invention as defined in claim 13 wherein said inspecting step comprises the step of inspecting only a predefined portion of the component.

18. System for correcting surface and near surface defects in components comprising:
   means for inspecting the component to determine a site and size and/or depth of the defect,
   means for determining if the defect is sufficiently small that the defect can be corrected by friction stir processing,
   means for transmitting information to a friction stir processing station to perform friction stir processing at the site of the defect if the defect is sufficiently small to be correctable by friction stir processing, and
   means for performing friction stir processing on the component at the site of the defect to thereby correct the defect.

19. The invention as defined in claim 18 wherein said inspecting means comprises x-ray inspecting means.

20. The invention as defined in claim 18 and further comprising means for selecting a friction stir processing tool as a function of the defect size and/or depth.

21. The invention as defined in claim 18 and comprising means for rejecting the component if the defect is greater than a predetermined size and/or depth.

22. The invention as defined in claim 18 wherein said inspecting means comprises means for inspecting only a portion of the component.

23. The invention as defined in claim 18 and comprising means for identifying the type of component.

24. The invention as defined in claim 23 wherein said identifying means comprises means for identifying an RFID tag.

25. The invention as defined in claim 18 and further comprising a conveyor means for selectively transporting the component from said inspecting means to the friction stir processing station.

* * * * *